W. F. HAMANN.
TRAP.
APPLICATION FILED MAR. 27, 1911.
1,077,064.
Patented Oct. 28, 1913.
2 SHEETS—SHEET 1.
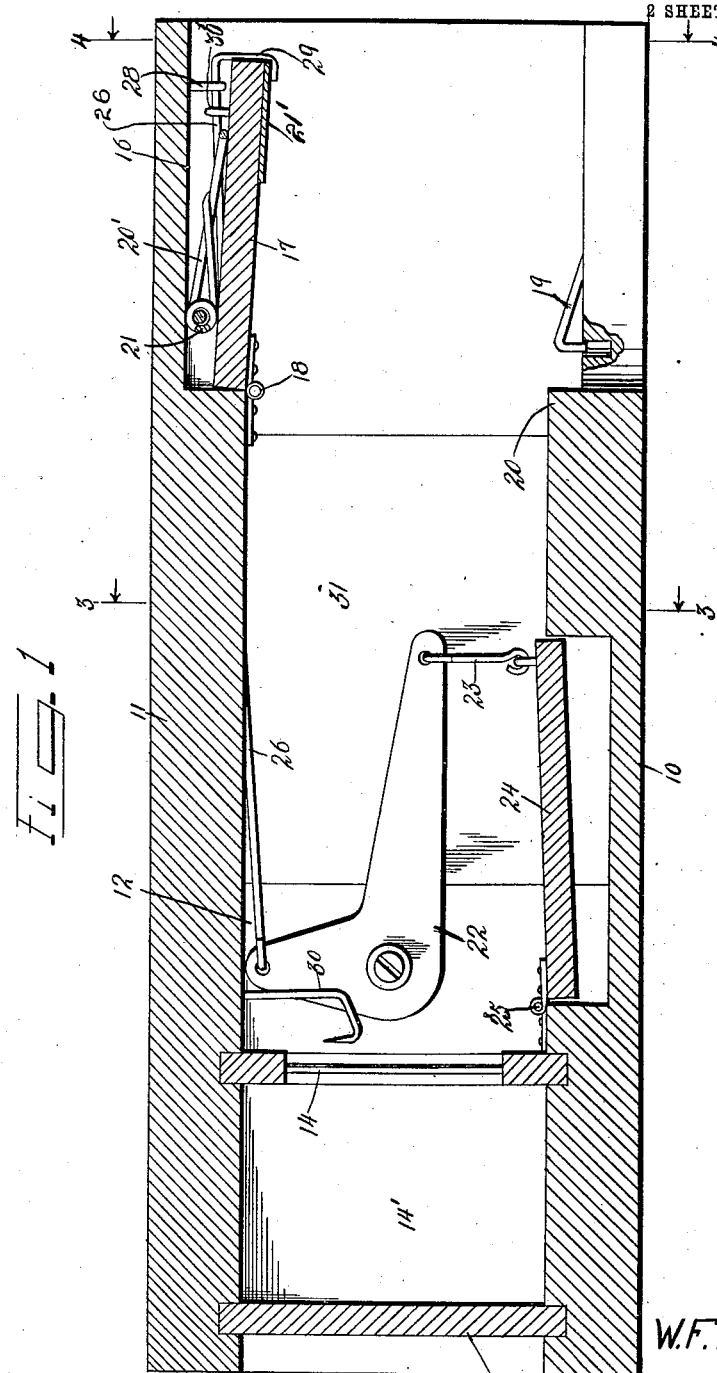
Witnesses
J. E. Strobel
Francis Boyle
Inventor
W. F. Hamann.
By Chandler & Chandler
Attorneys

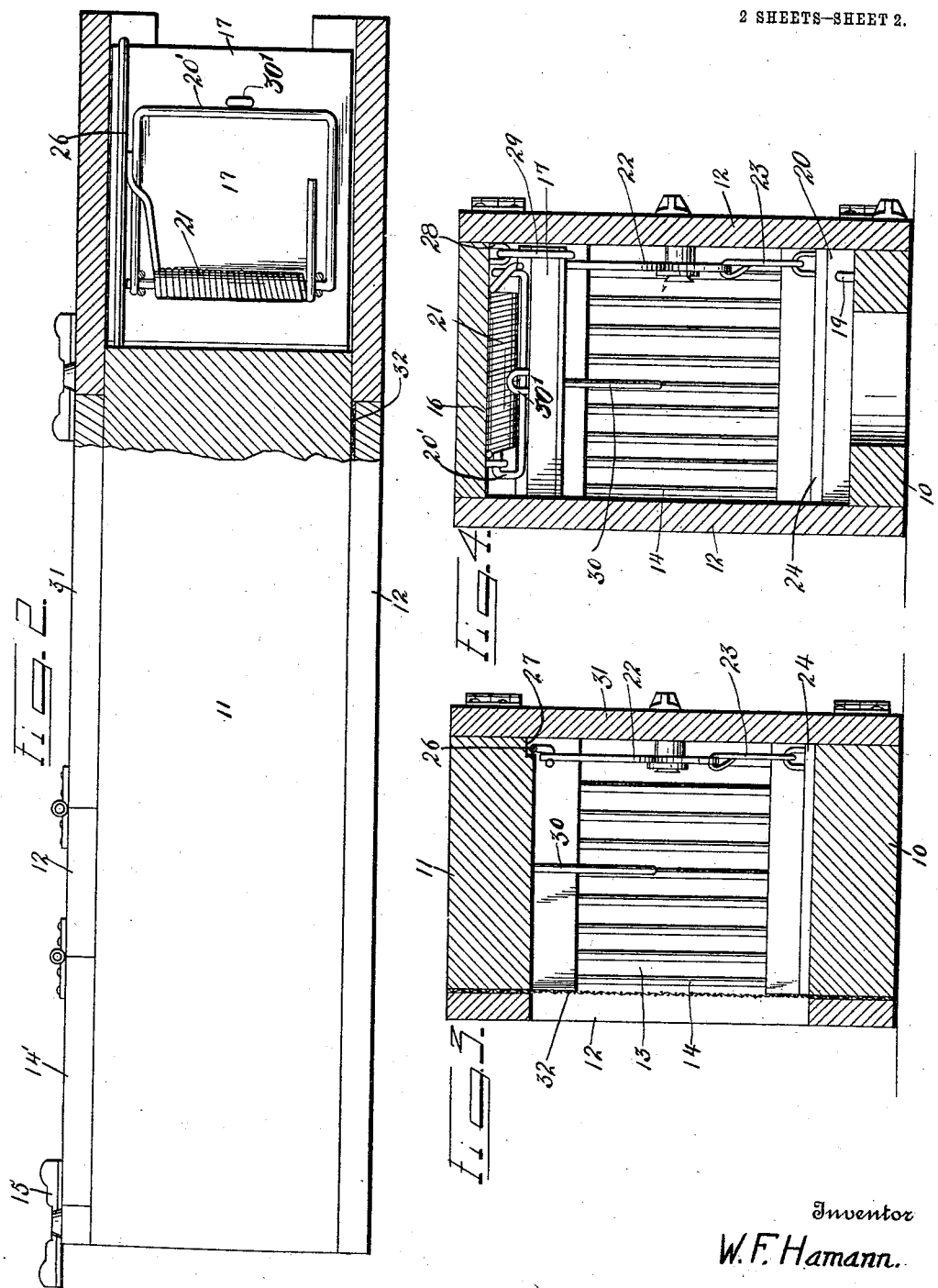

UNITED STATES PATENT OFFICE.

WILLIAM F. HAMANN, OF FLORENCE, NEBRASKA.

TRAP.

1,077,064.  Specification of Letters Patent.  Patented Oct. 28, 1913.

Application filed March 27, 1911. Serial No. 617,109.

*To all whom it may concern:*

Be it known that I, WILLIAM F. HAMANN, a citizen of the United States, residing at Florence, in the county of Douglas, State of Nebraska, have invented certain new and useful Improvements in Traps; and I do hereby declare the following to be a full, clear, and exact description of the invention, such as will enable others skilled in the art to which it appertains to make and use the same.

This invention relates to animal traps and has for its object to provide a trap for catching animals alive, this trap having a spring pressed swinging closure arranged on the roof of the trap, and tripped through the instrumentality of a trap door arranged on the floor, the tripping mechanism being so arranged as to be out of the path of movement of an animal entering the trap so that the closure will not be accidentally tripped before the animal has progressed entirely within the trap.

A further object of the invention is to provide a trap which may be baited with either live decoys or inanimate lures, provision being made whereby the entrapped animal may be removed from the trap without disturbing the live bait.

A still further object of the invention is to provide a trap having a closure tripping mechanism consisting of a single trap door actuated bell crank lever, and a single link leading from this lever and terminating in a catch for maintaining the closure in open position, this link extending along the roof of the trap and being partly concealed by the closure of the trap so that the entrance to the trap will be freed as far as possible from the conspicuous mechanism that in ordinary traps tend to frighten away the animal.

With the above objects in view the invention consists in certain novel details of construction and combination of parts hereinafter fully described and claimed, it being understood that various modifications may be made in the minor details of construction within the scope of the appended claim.

In the accompanying drawing forming part of this specification: Figure 1 is a longitudinal sectional view of a trap constructed in accordance with my invention. Fig. 2 is a plan view of the device with portions broken away to expose the interior of the trap. Fig. 3 is a cross sectional view taken on the line 3—3 Fig. 1. Fig. 4 is a cross sectional view taken on the line 4—4 Fig. 1.

Referring now to the drawing in which like characters of reference designate similar parts, the trap comprises an oblong casing having a bottom wall 10, top wall 11, vertical side walls 12, and an end wall 13. A partition 14 is arranged adjacent to the end wall and is preferably formed of skeleton structure to facilitate ventilation of the compartment formed between the partition and end wall. This compartment is designed to receive a fowl or other live decoy, insertion and removal of the decoy being made through a hinge door 14' formed in one side wall of the casing and normally held closed by a button 15 or other desired lock.

The top wall 11 is formed with an oblong rabbet 16 and in this rabbet a closure 17 is fitted, the closure being hinged at one end as shown at 18 to the top wall, and being of sufficient size to form a closure for the open end of the casing when swung downward into vertical position within the casing. The closure when in the latter position coöperates in forming with the partition a central compartment in the trap for imprisoning a trapped animal. A spring catch 19 arranged in the bottom wall of the casing, is depressed by the free edge of the closure as it swings downward, and springs back and engages the outer face of the closure after the closure has reached final position, and positively prevents the closure being pushed upward from within. A cleat 20 arranged transversely upon the casing bottom wall engages a wear plate 21' on the inner face of the closure and forms a stop to limit swinging movement of the closure and prevent the latter being swung inwardly past a vertical position. Through the instrumentality of the spring catch and cleat 20, the closure is positively held when once tripped against swinging movement in either direction within the casing. For moving the closure to closed position, a rectangular skeleton frame 20' is pivotally secured to the casing top wall through the instrumentality of spaced staples or the like straddled over one end bar of the frame, the opposite end bar bearing against the closure adjacent to the hinged edge of the latter. A helical spring 21 is seated upon the pivoted end bar of the frame, and bears with the extremity of one convolution against the top wall of the casing and with the extremity of its opposite terminal convolution against one of the side bars of the frame as shown in Fig. 4. The spring stores up energy as the closure is moved to its opened position to return the closure to closed position upon actuation of the hereinafter described tripping mechanism.

The tripping mechanism comprises a bell crank lever 22 pivoted at its elbow to one side wall of the casing and having one leg extending approximately horizontally forward in the casing toward the closure, this leg being terminally connected through the instrumentality of a link 23 with the free end of a trap door 24, the latter being of approximately the same cross dimension as the casing and being hingedly connected to the bottom wall of the casing as shown at 25. The trap door when set tilts upwardly, in the direction of the closure. The bell crank lever is equipped adjacent to the extreme end of its upright leg with a link 26, this link extending along the bottom face of the casing top wall for a short distance, then entering a groove 27 formed in the casing top wall and extending beyond this groove and into the rabbet 16 formed in the top wall, the free extremity of the link being supported by a staple 28 or the like fixed in the casing top wall, and terminating in a hook 29 which is designed to engage with the free end edge of the closure and hold the latter against the tension of its spring in open position. It will now be observed that since the link 26 extends along the top wall of the casing and at its free end is disposed between the top wall and opened closure, a greater portion of the link will be concealed from an animal entering the trap as will also the actuating spring of the closure so that a minimum amount of metal is exposed and thus frightening of the entering animal reduced to a minimum. Since the bell crank lever is secured to one side wall of the casing, and as will be noted by referring to Fig. 1 overlies in its entirety the trap door 24, no portion of the closure tripping mechanism will be disposed in the path of an animal entering the trap so that accidental tripping of the closure before the animal has completely progressed into the imprisoning compartment, is entirely obviated.

A hook 30 is fixed to the casing top wall adjacent to the partition 14 and forms means for suspending an inanimate lure within the imprisoning compartment. A handle in the nature of a staple 30' is fixed to the upper face of the closure near the free edge thereof and forms means for opening the same.

In order to facilitate removal of the entrapped animal, a door 31 is formed in one side wall of the casing, and in order to insure proper ventilation of the trap, the side wall opposite from this door is cut away and a reticulate element 32 such as heavy wire mesh or the like, secured to the marginal portions of the opening.

It will be noted that by virtue of the door in the imprisoning compartment, entrapped animals may be removed without disturbing a live decoy in the live decoy compartment, and thus a single live decoy may be utilized as a bait continuously.

What is claimed, is:—

A trap including a casing, a bell crank lever pivoted at its elbow to the inner face of one of the casing side walls, a trap door pivoted to the bottom of the casing and underlying said bell crank lever, a link connecting the lower leg of said lever to the free end of said trap door, a closure pivoted at its rear end to the top wall of said casing and rockable downwardly toward said bell crank lever into closed position, a spring interposed between said closure and said top wall operating to close said closure, and a link connected at one end to the upper leg of said bell crank lever and extending along the bottom face of the casing top wall between said top wall and said closure, a support engaging the forward end of said link and secured to said casing, said link terminating in a hook adapted to engage over the free edge of said closure and hold said closure open, said hook being slid forwardly from engagement with said closure upon actuation of said bell crank lever by said trap door with resultant release of said closure.

In testimony whereof, I affix my signature, in presence of two witnesses.

WILLIAM F. HAMANN.

Witnesses:
 H. S. DANIEL,
 HANNAH C. HAMANN.